(12) United States Patent
Howard et al.

(10) Patent No.: US 8,332,467 B2
(45) Date of Patent: Dec. 11, 2012

(54) LIGHTWEIGHT RRD EXTENSION FRAMEWORK

(75) Inventors: Curtiss J. Howard, Cary, NC (US); Todd E. Kaplinger, Raleigh, NC (US); Maxim A. Moldenhauer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 12/511,357

(22) Filed: Jul. 29, 2009

(65) Prior Publication Data

US 2011/0029593 A1 Feb. 3, 2011

(51) Int. Cl.
*G06F 15/16* (2006.01)
(52) U.S. Cl. ....................................... 709/203
(58) Field of Classification Search .............. 709/203
See application file for complete search history.

(56) References Cited

U.S. PATENT DOCUMENTS

| | | | |
|---|---|---|---|
| 7,240,096 B1* | 7/2007 | Dennis et al. | 709/206 |
| 2004/0015578 A1* | 1/2004 | Karakashian et al. | 709/223 |
| 2004/0054749 A1* | 3/2004 | Doyle et al. | 709/217 |
| 2005/0044233 A1* | 2/2005 | Cai et al. | 709/227 |
| 2006/0085421 A1* | 4/2006 | Backhouse et al. | 707/10 |
| 2006/0117257 A1* | 6/2006 | Hasson et al. | 715/535 |
| 2007/0294133 A1* | 12/2007 | Lasker et al. | 705/14 |
| 2008/0016151 A1* | 1/2008 | Howard et al. | 709/203 |
| 2008/0071922 A1* | 3/2008 | Chetuparambil et al. | 709/236 |
| 2008/0127234 A1* | 5/2008 | Hesmer et al. | 719/330 |
| 2008/0215675 A1* | 9/2008 | Kaminitz et al. | 709/203 |
| 2010/0250649 A1* | 9/2010 | Larsson et al. | 709/203 |

OTHER PUBLICATIONS

Hesmer, Stephan et al. "IBM WebSphere Developer Technical Journal: Include remote files in your Web application seamlessly with the new Remote Request Dispatcher" Aug. 23, 2006. http://www.ibm.com/developerworks/websphere/techjournal/0608_hesmer/0608_hesmer.html pp. 1-15.*
"Representational State Transfer" http://en.wikipedia.org/wiki/Representational_State_Transfer, pp. 1-13, Retrieved Mar. 23, 2011.

* cited by examiner

*Primary Examiner* — Imad Hussain
(74) *Attorney, Agent, or Firm* — Law Office of Jim Boice

(57) ABSTRACT

A local server requests a resource from a remote server by using a remote request dispatcher (RRD) request that has been extended to utilize a javascript object notation (JSON).

20 Claims, 3 Drawing Sheets

LIGHTWEIGHT RRD EXTENSION FRAMEWORK

BACKGROUND

The present disclosure relates to the field of computers, and specifically to resources that are retrieved and provided by servers. Still more particularly, the present disclosure relates to requesting resources in a remote request dispatcher (RRD) environment.

BRIEF SUMMARY

A local server requests a resource from a remote server by using a remote request dispatcher (RRD) request that has been extended to utilize a javascript object notation (JSON).

DETAILED DESCRIPTION

Figure 1:
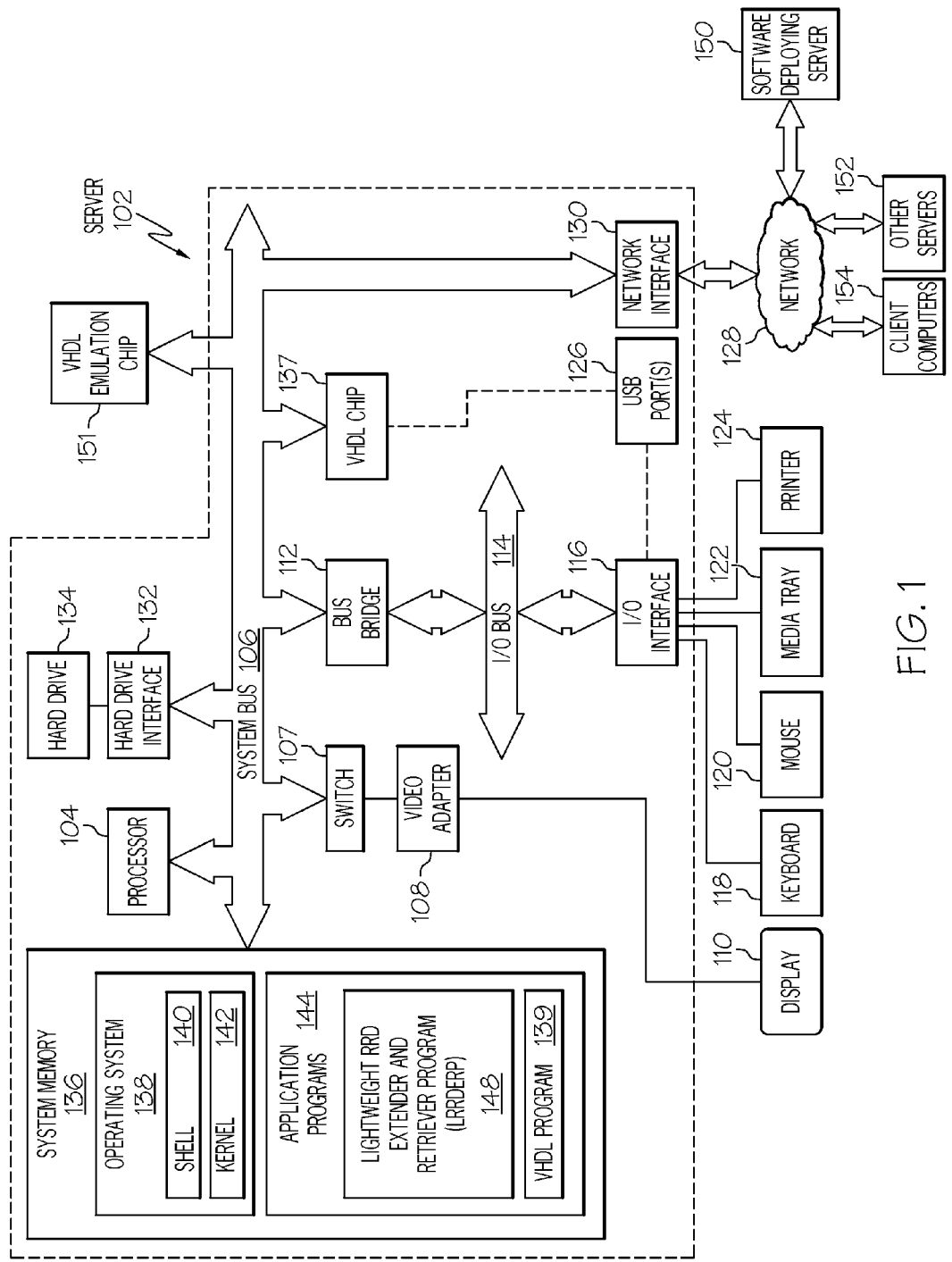
FIG. 1 depicts an exemplary hardware device in which the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary server 102, which may be utilized by the present invention. Note that some or all of the exemplary architecture, including both depicted hardware and software, shown for and within server 102 may be utilized by a software deploying server 150, other servers 152, and/or client computers 154. Similarly, some or all of the architecture shown for server 102 may be utilized by local server 202, remote server 204, and client computers 206 shown in FIG. 2.

Server 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., lightweight remote request dispatcher extender and retriever program—LRRDERP 148 described below) that support the processes described herein.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of server architecture, in a preferred embodiment some or all of these ports are universal serial bus (USB) ports.

Figure 2:
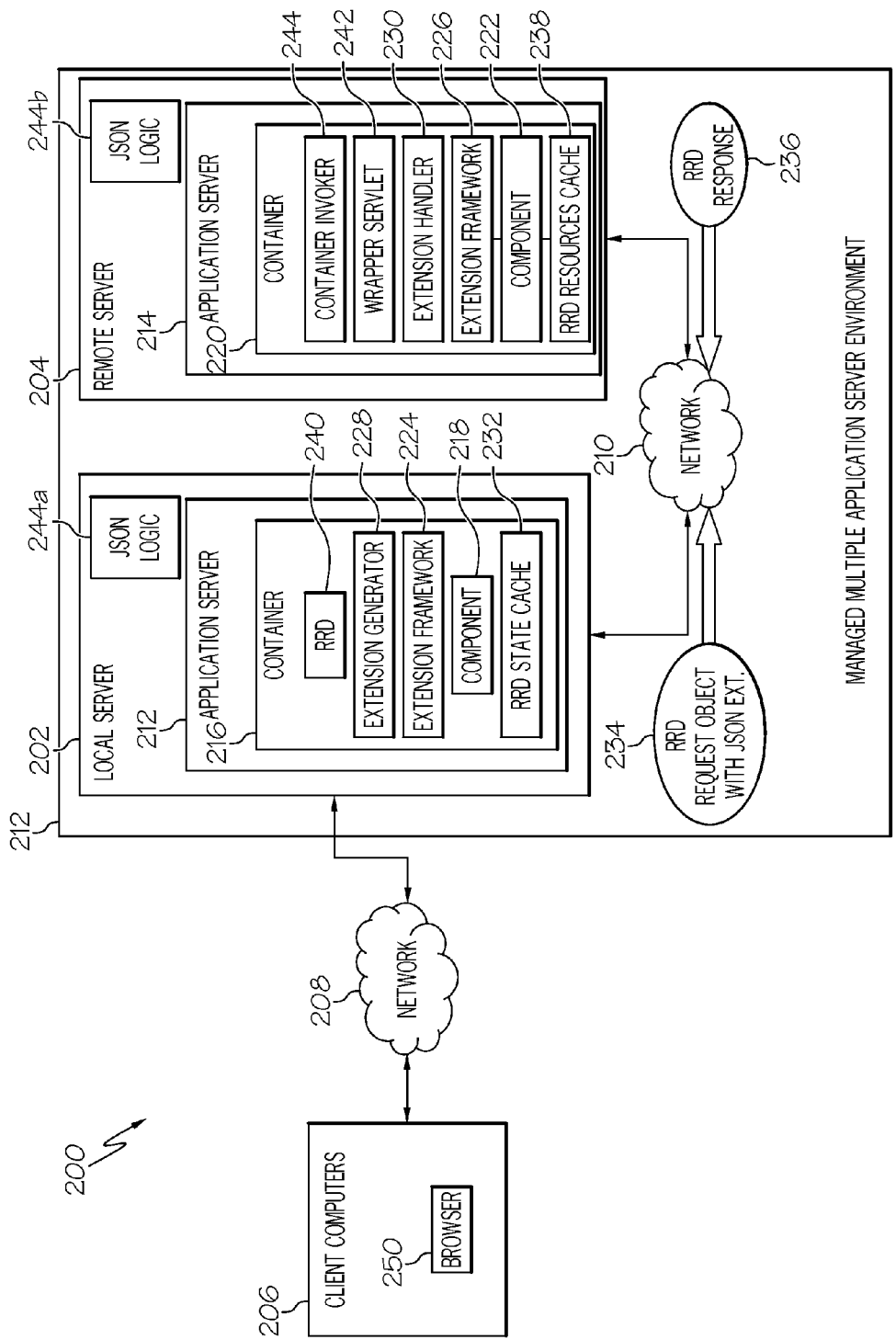
FIG. 2 illustrates a remote request dispatcher (RRD) system as used in one embodiment of the present invention.

As depicted, server 102 is able to communicate with a software deploying server 150 and other servers 152, as well as a client computer such as client computer 216 depicted in FIG. 2, via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in server 102. This volatile memory includes additional higher levels of volatile memory (not shown), including, but not limited to, cache memory, registers and buffers. Data that populates system memory 136 includes server 102's operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 in server 102's system memory (as well as software deploying server 150's system memory) also include a lightweight remote request dispatcher extender and retriever program (LRRDERP) 148. LRRDERP 148 includes code for implementing the processes described below, including those described in FIGS. 2-3. LRRDERP 148 includes, but is not limited to, instructions used by the client computer 152 to upload client content to the server 102, and instructions used by the server 102 to send user engagement content to the client computer 152, in a manner described in exemplary details below.

In one embodiment, server 102 is able to download LRRDERP 148 from software deploying server 150, including in an on-demand basis. Note further that, in one embodiment of the present invention, software deploying server 150 performs all of the functions associated with the present invention (including execution of LRRDERP 148), thus freeing server 102 from having to use its own internal computing resources to execute LRRDERP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from LRRDERP 148 causes VHDL program 139 to configure VHDL chip 137, which may be an FPGA, ASIC, etc.

In another embodiment of the present invention, execution of instructions from LRRDERP 148 results in a utilization of VHDL program 139 to program a VHDL emulation chip 151. VHDL emulation chip 151 may incorporate a similar architecture as described above for VHDL chip 137. Once LRRDERP 148 and VHDL program 139 program VHDL emulation chip 151, VHDL emulation chip 151 performs, as hardware, some or all functions described by one or more executions of some or all of the instructions found in LRRDERP 148. That is, the VHDL emulation chip 151 is a hardware emulation of some or all of the software instructions found in LRRDERP 148. In one embodiment, VHDL emulation chip 151 is a programmable read only memory (PROM) that, once burned in accordance with instructions from LRRDERP 148 and VHDL program 139, is permanently transformed into a new circuitry that performs the functions needed to perform the process described below in FIGS. 2-3.

Note that the hardware described as exemplary logic for the functions described above are merely exemplary, and other hardware/software shown in FIG. 1 may be utilized to provide the same described and other logic necessary to perform the processes described herein by the present invention.

With reference now to FIG. 2, a block diagram is depicted of a system 200 upon which a remote request dispatcher (RRD) extension framework can be implemented in a multiple application server environment. RRD enables a remote resource (e.g., remote server 204) to access a requestor's related state information and allows installation of applications on separate application servers without requiring modification of application code. RRD also enables seamless integration of Web components, such as servlets, across multiple application servers within a managed application server environment. The RRD extension framework disclosed herein allows an RRD to support further programming models and container technologies, such as portlets or Session Initiation Protocol (SIP) components. In exemplary embodiments, an RRD portlet framework leverages the RRD extension framework to enable local and remote transparency for portlets.

In one embodiment, system 200 includes a local server 202 (analogous to server 102 shown in FIG. 1) in communication with client computers 206 (analogous to client computers 154 shown in FIG. 1) over a network 208. Note that each of the client computers 206 also include a renderer, shown in exemplary manner as a browser 250. Browser 250 includes program modules and instructions enabling a world wide web (WWW) client to send and receive network messages to the Internet using hypertext transfer protocol (HTTP) messaging, thus enabling communication with local server 202.

System 200 also comprises remote server 204 (analogous to other servers 152 shown in FIG. 1) in communication with local server 202 over a network 210. This combination of local server 202, remote server 204, and network 210 is collectively referred to as a managed multiple application server environment 212. Local server 202 may be a high-speed processing device (e.g., a mainframe computer) that handles large volumes of processing requests from client computers 206. In exemplary embodiments, local server 202 functions as an application server, Web server, portal server, and database management server. Client computers 206 are desktop or general-purpose computer devices that generate data and processing requests, such as requests to utilize applications and perform searches. For example, client computers 206 may request Web pages, documents, and files that are stored in various storage systems. In exemplary embodiments, remote server 204, like local server 202, also functions as an application server, Web server, portal server, and database management server. In exemplary embodiments, remote server 204 is not in communication with client computers 206, while local server 202 is in communication with client computers 206. Although only two servers 202 and 204 are shown in FIG. 2, it is to be understood that multiple servers may be implemented as part of managed multiple application server environment 212, with each server in communication with one another via direct coupling or via one or more networks such as network 210. For example, multiple servers may be interconnected through a distributed network architecture, with each server running zero or more application servers. Furthermore, local server 202 and remote server 204 may be independent software processes both executing on a shared hardware system.

Networks 208 and 210 may be any type of communications network known in the art. For example, networks 208 and 210 may be intranets, extranets, or internetworks, such as the Internet, or a combination thereof. Networks 208 and 210 may be wireless or wireline networks. Networks 208 and 210 may be components of a common network or may be isolated from each other. Network 210 may be a combination of internal hardware and software communication schemes when servers such as local server 202 and remote server 204 embodied in managed multiple application server environment 212 execute on a shared hardware system.

In exemplary embodiments, both local server 202 and remote server 204 run application servers, such as application servers 212 and 214. On local server 202, application server 212 holds container 216, which manages component 218. On remote server 204, application server 214 holds container 220, which manages component 222. A container is part of an application server in which components (e.g., components 218, 222) run. A container may hold one or more components such as servlets, portals, portlets, JavaServer Pages technology (JSP files), and Hypertext Markup Language (HTML) files.

In exemplary embodiments, an application such as a portal running on application server 212 may allow client computers 206 to each receive different personalized content through portlets, which may run as component 218. The users of client computers 206 may each see different customized content, for example personal bank account information or investment portfolios. The information required to construct the customized content for the users of client computers 206 may reside on separate application servers such as application server 212 and application server 214. In exemplary embodiments, component 218 may incorporate the output of the component 222 as part of the response to client computers 206 as described further herein.

Various container based programming models may have different requirements such as access to particular types of data, means for accessing persistent configuration data, methods for generating dynamic content, access to application-wide data, and other such variations. Furthermore, container based programming models may be defined to operate in a tiered fashion, such that a higher-level container may rely on a lower-level container for various services and data. To support flexible deployment of containers based on various container based programming models in a managed multiple application server environment, such as managed multiple application server environment 212, the inventive principles of a remote request dispatcher (RRD) extension framework enable the integration of extensions into RRD requests and RRD responses. In one embodiment of the present invention, this extension is a javascript object notation (JSON) extension. In exemplary embodiments, this RRD extension framework is distributed across application servers 212 and 214, and managed though extension framework logic 224 and 226. RRD extension framework logic 224 invokes an extension generator 228 (which generates appropriate JSON extensions) and RRD extension framework logic 226 invokes an extension handler 230, both of which support customizable extended information exchange between containers across application server boundaries.

Note that it is local server 202 that generates the javascript object notation (JSON)-extended remote request dispatcher (RRD) request for the resource. This JSON-extended RRD request comprises a name:value pair that is hierarchically mapped, wherein a name identifies the resource, and wherein the value represents the resource. In one embodiment, local server 202 populates a local RRD state cache 232 within the local server with RRD session state data for the JSON-extended RRD request for the resource. This RRD session state data includes, but is not limited to, an identifier of which computer from the client computers 206 requested the resource, as well as an identifier for the remote server 204. Thus, when local server 202 transmits future RRD requests (discussed below) to the remote server 204, all RRD session state data is readily available to the local server 202 only. Note that client computers 206 (or remote server 204) never store RRD session state data, thus reducing their overhead. This also keeps control of the RRD session solely within the local server 202.

Thus, as depicted in FIG. 2, local server 202 transmits an RRD request object 234 (with a JSON extension) to the remote server 204. The local server 202 eventually receives an RRD response 236, which may be populated from an RRD resources cache 238 within container 220. Note that the RRD response 236 contains the resource that was requested by the client computers 206 (via local server 202), but RRD response 236 contains no session data other than the address for local server 202. Thus, local server 202 controls (and is the only entity to "know") where the resources are to be sent (i.e., which of the client computers 206 will receive the requested resource). The resource (i.e., the "value" in the JSON name: value pair) returned in the RRD response 236 may be a copy of the resource itself (e.g., a copy of a file), a uniform resource locator (URL) to a website that contains the content, or a name in another JSON name:value pair that points to the requested resource. In one embodiment, all requests for resources from the client computers 206 are generated using browser 250 to request the resource.

In one embodiment, resource requests from the client computers 206 are directed in accordance with past classifications of resource types made by the local server 202. Thus, classifying resources enables the local server 202 to direct a resource request, from the client computers 206, to a particular RRD remote server that specializes in responding to requests for resources meeting a classification of a requested resource. This specialized RRD remote server may be remote server 204 or another remote server (not shown).

In one embodiment, requested resources are addressed by the local server 202 using a universal syntax for use in a hypermedia link that is a link to a webpage that comprises text, video, and audio content. Thus, this universal syntax (e.g., hypertext transfer protocol—HTTP) is usable by the client computers 206, local server 202, and remote server 204, thus making access to the resource available to all entities.

Returning to the application server 212 shown in FIG. 2, a remote request dispatcher (RRD) 240 may be employed when a component such as component 218 requests an action from a remote component (e.g., component 222), where component 218 references component 222. The RRD 240 dispatches the request to remote application server 214 as RRD request object 234. The RRD request object 234 may contain serializable portions of the request context of component 218. The extension framework logic 224 on local application server 212 may invoke (JSON) extension generator 228 prior to sending the RRD request object 234 to remote application server 214. In exemplary embodiments, extension generator 228 is a JSON component that utilizes a JSON logic 244*a* to create an extension of arbitrary data, and then attaches the extension to an RRD request, such as RRD request object 234. The extension to RRD request object 234 may contain additional relevant serializable portions of the request context for container 216. By allowing arbitrary extension data, the RRD extension framework does not impose any limits on the type of containers or programming models.

In exemplary embodiments, extension generator 228 includes an identification attribute, a class attribute that specifies the name of the extension generator implementation class, and an order attribute specifying the extension generator execution order. Additionally, extension generator 228 may include an attribute called "type" that defines a JSON programming model associated with the extension generator to support mapping an RRD request type to an extension generator type. In an exemplary embodiment, this type attribute is a JSON extension, in which resources are identified according to JSON name:value pairs defined by the extension generator 228, and is extendable through extension generator chains, which may be invoked prior to initiating an RRD request. An extension generator chain is an extension point of an RRD that supports multiple extension generators, such as extension generator 228, to add extensions to an RRD request and process extensions from an RRD response.

In exemplary embodiments, RRD request object 234 with JSON extension is transmitted to remote application server 214. The extension framework logic 226 on remote application server 214 may invoke extension handler 230, parsing the JSON extension extracted from RRD request object 234 for use by JSON logic 244*b* to locate the requested resource. In exemplary embodiments, extension handler 230 is a JSON component that enables JSON logic 244*b* to process JSON code and performs actions based on data contained in the JSON extension. In exemplary embodiments, extension handler 230 and JSON logic 244*b* include logic for processing the mapping associated with the JSON code, in order to retrieve the requested resource.

Once extension handler 230 and JSON logic 244*b* have processed the JSON extension, a wrapper servlet 242 is called, which further invokes remote container 220 via a container invoker 244. The remote container 220 performs the requested action on remote component 222. Once the RRD request 234 is processed on remote application server 214, an RRD response object 236 is created. Note that RRD response object 236 merely contains the retrieved requested resource and an address/identifier for local server 202. Local server 202, using RRD state cache 232 and JSON logic 244*a*, then transmits the requested resource to the appropriate computer from the client computers 206.

Figure 3:
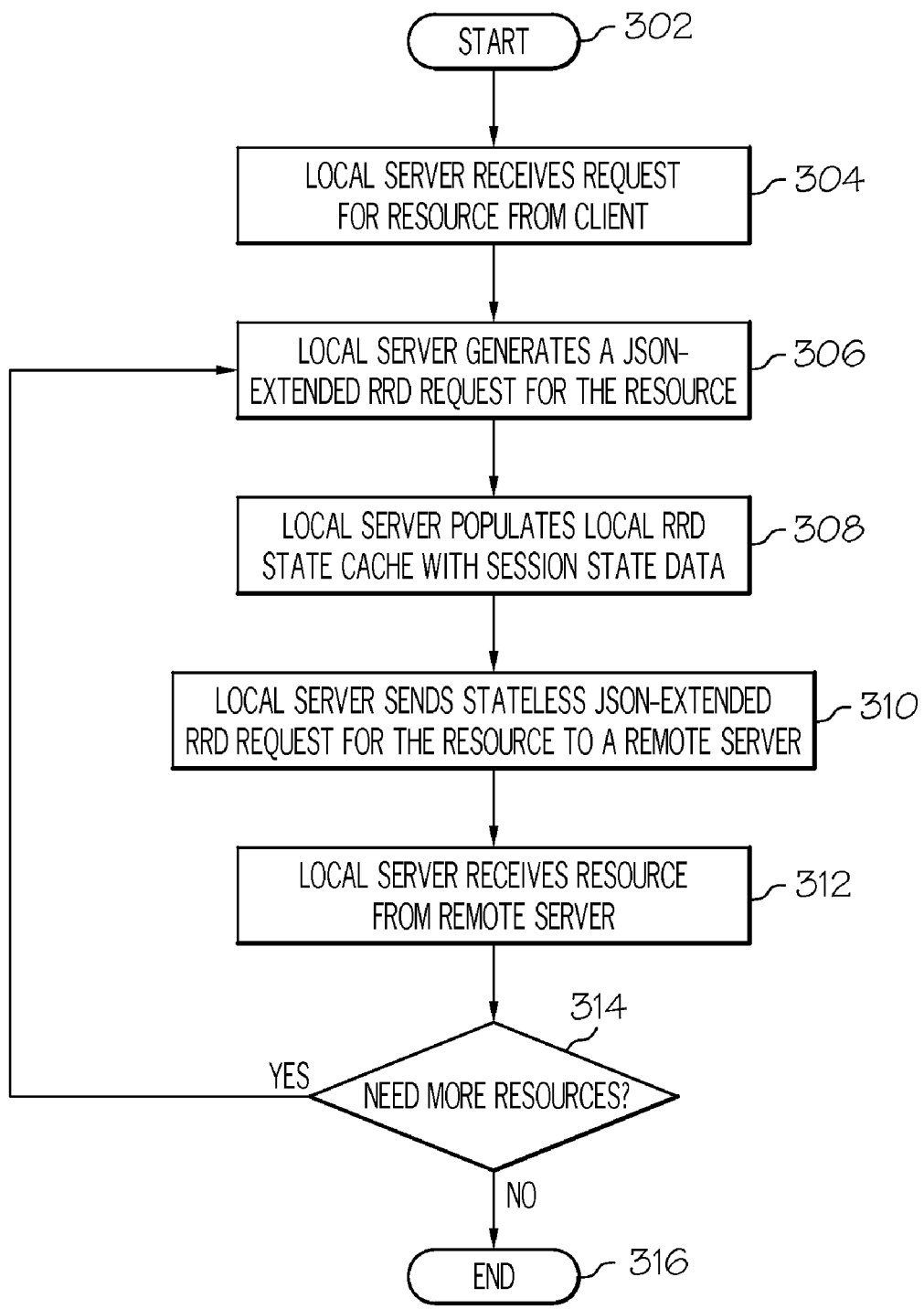
FIG. 3 is a high-level flow-chart of exemplary steps taken to request resources from a remote server by utilizing a javascript object notation (JSON) extended RRD request from a local server.

Referring now to FIG. 3, an high-level flow chart of exemplary steps taken to utilize JSON between a local and remote server to locate requested resources for a client is presented. After initiator block 302, a local server receives a request for a resource from a client computer (block 304). The local server then generates a JSON-extended RRD request for the resource (block 306), and populates a local cache with session state data for future use between the local server and a remote server (block 308). The local server then sends a stateless JSON-extended RRD request for the resource to the remote server (block 310), which returns the retrieved resource to the local server (block 312). If additional resources are needed (query block 314), the local server uses the locally-cached RRD session state data to send additional RRD requests to the remote server. Otherwise, the process ends (terminator block 316).

The use of non-SOAP based protocols for communications between two RRD servers was uniquely challenging to the present inventors, leading to a solution that was unexpected and significant over the prior art. Specifically, the present inventors, like others skilled in the art of browser technology, understood that JSON, a data-interchange format that is a subset of JavaScript, is very prevalent in modern browsers and has become a standard for communication between clients (web browsers) and servers using AJAX (Asynchronous JavaScript and XML). However, the accepted protocols for server-to-server communication continue to utilize RPC (Remote Procedure Calls) or SOAP based requests. JSON has not been considered for use in server-to-server communication prior to the present invention, since it was generally understood to be client-based and to require the use of a browser. RRD servers, as described herein, do not use a browser. Thus, RPC and SOAP were previously the standard to use with RRD, which utilizes Web Services and the Eclipse Modeling Framework (EMF), wherein EMF provides a framework for code generation using protocols such as SOAP. However, the present embodiment, as described herein, describes a novel use of JSON extenders, JSON logic, and JSON-based RRD requests not previously considered for use in server-to-server, and particularly RRD server-to-server, communications. This system and protocol overcomes inefficiencies in an SOAP-based RRD system by redefining the system from an EMF-based system to a JSON-based system, which has not been attempted before in an RRD system. A redefinition of the RRD architecture from SOAP to JSON was not previously considered in the prior teachings, since the prior teachings understood that JSON required 1) a client and 2) a browser, neither of which are found in the RRD server-to-server architecture. This redefinition restructures the conceptual architecture of the RRD system into a new and non-obvious JSON-based system, in which RRD requests are processed in a fundamentally different approach than that used by SOAP and EMF-based systems.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of retrieving a resource via a remote server, the method comprising:
   a local server receiving a request for a resource from a client computer, wherein the local server lacks a browser;
   the local server generating a javascript object notation (JSON)-extended remote request dispatcher (RRD) request for the resource, wherein the JSON-extended RRD request comprises a name:value pair that is hierarchically mapped, wherein the name identifies the resource, and wherein the value represents the resource;
   the local server populating a local cache within the local server with locally-cached RRD session state data for the JSON-extended RRD request for the resource;
   the local server transmitting the JSON-extended RRD request to a remote server;
   the local server'receiving an RRD response from the remote server, wherein the RRD response comprises the resource that was requested by the client computer; and
   the local server transmitting the resource to the client computer, wherein the resource is transmitted in a stateless form during a communication session between the local server and the client computer, and wherein the client computer stores no session state information during the communication, session.

2. The method of claim 1, further comprising:
   the local server using locally-cached RRD session state data to generate additional JSON-extended RRD requests to the remote server.

3. The method of claim 1, wherein the value is the resource itself.

4. The method of claim 1, wherein the value is a uniform resource locator (URL) to a website that contains the content.

5. The method of claim 1, wherein the RRD session state data comprises an identifier of both the remote computer and the client computer.

6. The method of claim 1, wherein the client computer utilizes a browser to request the resource.

7. The method of claim 1, wherein the resource is classified by the local server, wherein classifying resources enables the local server to direct a resource request, from the client computer, to a RRD remote server that specializes in responding to requests for resources meeting a classification of a requested resource.

8. The method of claim 1, wherein the value is another name, wherein said another name points to the resource.

9. The method of claim 1, wherein the resource is addressed using a universal syntax for use in a hypermedia link, wherein the hypermedia link is a link to a webpage that comprises text, video, and audio content.

10. A computer program product for retrieving a resource from a remote server, said computer program product comprising:
    a non-transitory computer readable medium having computer usable program code embodied therewith, said computer usable program code comprising:
    computer usable program code configured for a local server to receive a request for a resource from a client computer;
    computer usable program code configured to generate a javascript object notation (JSON)-extended remote request dispatcher (RRD) request for the resource, wherein the JSON-extended RRD request comprises a name:value pair that is hierarchically mapped, wherein the name identifies the resource, and wherein the value represents the resource;

computer usable program code configured to populate a local cache within the local server with RRD session state data for the JSON-extended RRD request for the resource;

computer usable program code configured to transmit the JSON-extended RRD request to a remote server;

computer usable program code configured to receive an RRD response from the remote server, wherein the RRD response comprises the resource that was requested by the client computer; and computer usable program code configured to transmit the resource to the client computer, wherein the resource is transmitted in a stateless form during a communication session between the local server and the client computer, and wherein the client computer stores no session state information during the communication session.

11. The computer program product of claim 10, wherein the value is a uniform resource locator (URL) to a website that contains the content.

12. The computer program product of claim 10, wherein the RRD session state data comprises an identifier of both the remote computer and the client computer.

13. The computer program product of claim 10, wherein the client computer utilizes a browser to request the resource.

14. The computer program product of claim 10, wherein the resource is classified by the local server, wherein classifying resources enables the local server to direct a resource request, from the client computer, to a RRD remote server that specializes in responding to requests for resources meeting a classification of a requested resource.

15. The computer program product of claim 10, wherein the value is another name, wherein said another name points to the resource.

16. The computer program product of claim 10, wherein the resource is addressed using a universal syntax for use in a hypermedia link, wherein the hypermedia link is a link to a webpage that comprises text, video, and audio content.

17. A remote server comprising:

a hardware receiver suitably configured to receive a request for a resource from a local server, wherein the request is formatted as a javascript object notation (JSON)-extended remote request dispatcher (RRD) request for the resource, wherein the JSON-extended RRD request comprises a name:value pair that is hierarchically mapped, wherein the name identifies the resource, and wherein the value represents the resource; and the hardware receiver suitably configured to transmit an RRD response to the local server, wherein the RRD response comprises the resource that was requested by a client computer, wherein the RRD response enables the local server to transmit the resource to the client computer in a stateless form during a communication session between the local server and the client computer without the client computer storing session state information during the communication session, and wherein the local server and the remote server each lack a browser.

18. The remote server of claim 17, wherein the value is the resource itself.

19. The remote server of claim 17, wherein the value is a uniform resource locator (URL) to a website that contains the content.

20. The remote server of claim 17, wherein the resource is classified by the remote server, wherein classifying resources enables the remote server to direct a resource request, from the local server, to a network location that specializes in responding to requests for resources meeting a classification of a requested resource.

* * * * *